United States Patent
Kouno et al.

(10) Patent No.: US 10,060,760 B2
(45) Date of Patent: Aug. 28, 2018

(54) MAGNETIX FLUX POSITION DETECTOR THAT DETECTS THE MAGNETIC FLUX AT MINIMUM POSITION ALONG A MAGNETIC CIRCUIT

(71) Applicant: DENSO CORPORATION, Kariya, Aichi-pref. (JP)

(72) Inventors: Naoaki Kouno, Chiryu (JP); Tetsuji Yamanaka, Obu (TW)

(73) Assignee: DENSO CORPORATION, Kariya (JP)

( * ) Notice: Subject to any disclaimer, the term of this patent is extended or adjusted under 35 U.S.C. 154(b) by 412 days.

(21) Appl. No.: 14/142,146

(22) Filed: Dec. 27, 2013

(65) Prior Publication Data

US 2014/0184208 A1    Jul. 3, 2014

(30) Foreign Application Priority Data

Dec. 27, 2012 (JP) ................. 2012-286102

(51) Int. Cl.
*G01B 7/30* (2006.01)
*G01D 5/14* (2006.01)

(52) U.S. Cl.
CPC .............. *G01D 5/145* (2013.01); *G01B 7/30* (2013.01)

(58) Field of Classification Search
CPC .. G01D 5/2258; G01D 5/2266; G01D 5/2275; G01D 5/2283; G01D 5/2033; G01D 5/204; G01D 5/2046; G01D 5/2053; G01D 5/206; G01D 5/22; G01D 5/2208; G01D 5/2216; G01D 5/2225; G01D 5/2233;
(Continued)

(56) References Cited

U.S. PATENT DOCUMENTS 4,810,965 A * 3/1989 Fujiwara et al. ........ 324/207.22
6,593,734 B1 * 7/2003 Gandel et al. .......... 324/207.25
(Continued)

FOREIGN PATENT DOCUMENTS

JP   08-292004   11/1996
JP   10-104044    4/1998
(Continued)

OTHER PUBLICATIONS

Machine English translation of the detailed description of JP 08-292004, obtained from the Japanese Patent Office website, obtained on Apr. 2, 2015.*
(Continued)

*Primary Examiner* — David M. Schindler
(74) *Attorney, Agent, or Firm* — Nixon & Vanderhye P.C.

(57) ABSTRACT

A position detector has a Hall IC movably disposed on a mold within a gap between a first magnetic flux transmission part and a second magnetic flux transmission part for outputting a signal according to a density of a magnetic flux passing therethrough. Movement of the Hall IC relative to a rotating body is detected by the Hall IC. The Hall IC has a first flux collector and a second flux collector. A magnetic resistance of a first magnetic path between the first flux collector and a first flux transmission part and a magnetic resistance of a second magnetic path between the second flux collector and a second flux transmission part are configured so that the Hall IC is movable relative to the rotating body at a predetermined radial distance where the magnetic flux density decreases to a minimum.

6 Claims, 7 Drawing Sheets

(58) Field of Classification Search
CPC ........ G01D 5/2241; G01D 5/225; G01D 5/14;
G01D 5/142; G01D 5/145; G01D 5/147;
G01D 5/16; G01D 5/20; G01D 5/2006;
G01D 5/2013; G01D 5/202; G01D
5/2026; G01B 7/02; G01B 7/023; G01B
7/04; G01B 7/046; G01B 7/14; G01B
7/305; G01B 7/31; G01B 7/312; G01B
7/30; G01R 15/202; G01R 15/205; G01R
15/20

See application file for complete search history.

(56) References Cited

U.S. PATENT DOCUMENTS

| | | | | |
|---|---|---|---|---|
| 2002/0186009 A1* | 12/2002 | Makino et al. | .......... | 324/207.25 |
| 2004/0008025 A1* | 1/2004 | Johnson et al. | .......... | 324/207.2 |
| 2011/0080163 A1* | 4/2011 | Hariu et al. | .......... | 324/207.25 |

FOREIGN PATENT DOCUMENTS

| | | |
|---|---|---|
| JP | 2012-220481 A | 11/2012 |
| JP | 2014-126553 | 7/2014 |

OTHER PUBLICATIONS

Kouno, et al., U.S. Appl. No. 14/142,434, filed Dec. 27, 2013.
Kouno, et al., U.S. Appl. No. 14/142,456, filed Dec. 27, 2013.
Kouno, et al., U.S. Appl. No. 14/142,168, filed Dec. 27, 2013.
Kouno, et al., U.S. Appl. No. 14/142,195, filed Dec. 27, 2013.
Kouno, et al., U.S. Appl. No. 14/142,154, filed Dec. 27, 2013.
Yamanaka, et al., U.S. Appl. No. 14/142,133, filed Dec. 27, 2013.

\* cited by examiner

MAGNETIX FLUX POSITION DETECTOR THAT DETECTS THE MAGNETIC FLUX AT MINIMUM POSITION ALONG A MAGNETIC CIRCUIT

CROSS-REFERENCE TO RELATED APPLICATION

The present application is based on and claims the benefit of priority of Japanese Patent Application No. 2012-286102 filed on Dec. 27, 2012, the disclosure of which is incorporated herein by reference.

TECHNICAL FIELD

The present disclosure generally relates to a position detector for detecting a position of a detection object.

BACKGROUND

Generally, a magnetic-type position detector detects a change in the position of a detection object relative to a reference part. The magnetic-type position detector may utilize a magnetic flux generator such as a magnet. For example, a position detector disclosed in a patent document 1 (i.e., Japanese Patent Laid-Open No. JP-A-H08-292004) is configured form a closed magnetic circuit having two magnets and two magnetic flux transmission parts that are disposed on a reference part. In such structure, the two magnets are respectively bound by the ends of the two mutually-facing magnetic flux transmission parts. A flow of spill magnetic fluxes from one transmission part to the other occurs within a gap between the respective ends of the two magnetic flux transmission parts. A magnetic flux density detector is configured to move together with the detection object within the gap between the two magnetic flux transmission parts and to output a detection signal according to the magnetic flux passing therethrough. In such manner, the position detector detects the position of the detection object relative to the reference part based on an output signal that is output from the magnetic flux detector.

In the patent document 1, the position detector is described as being capable of detecting a rotation position of the detection object that is rotated relative to the reference part (refer to FIG. 8 in the patent document). The position detector has two magnetic flux transmission parts formed to extend along a virtual circle that is centered on an axis of rotation of the detection object. Further, the position detector arranges two yokes that are disposed to bind or sandwich the magnetic flux density detector in the radial direction of the virtual circle, for concentrating the flow of the magnetic flux to the magnetic flux density detector in between the two magnetic flux transmission parts.

In this case, each of two yokes has a face which faces a respective magnetic flux transmission part. Each respective magnetic flux transmission part has a planar shape. Further, a yoke-facing face of one of the two magnetic flux transmission parts has a convex shape, while a yoke-facing face of the other one of the two magnetic flux transmission parts has a concave shape. Therefore, when the magnetic flux density detector is positioned at a midpoint between the two magnetic flux transmission parts, a permeance differs in two magnetic paths, that is, between (i) a magnetic path from one transmission part to the yoke and (ii) a magnetic path from the other transmission part to the yoke.

In such configuration, a minimum flux position where the magnetic flux density decreases to a minimum in the gap between two magnetic flux transmission parts along the radial direction of the virtual circle shifts away in the radial direction from a position of the magnetic flux density detector. As a result, a change of the magnetic flux density at the proximity of the density detector according to the shift of the density detector in the radial direction of the virtual circle increases. Therefore, a change of an output signal from the density detector due to the shift of the density detector in the radial direction of the virtual circle may increase. Thus, robustness of the position detector for the position shift of the density detector may deteriorate. That is, in other words, the position detection accuracy for detecting the position of the detection object may be deteriorated in the position detector of the patent document 1.

SUMMARY

It is an object of the present disclosure to provide a position detector that has a magnetic flux density detecting part with improved position detection accuracy.

In an aspect of the present disclosure, the position detector detects a position of a detection object that moves relative to a reference part, the position detector. The position detector includes a first magnetic flux transmission part disposed on one of the detection object or the reference part, the first magnetic flux transmission part having a first end and a second end, and a shape that extends along a first virtual circle concentric to a rotation axis of the detection object. The position detector also includes a second magnetic flux transmission part disposed to define a gap between the first magnetic flux transmission part and the second magnetic flux transmission part, the second magnetic flux transmission part having a first end, a second end, and a shape that extends along a second virtual circle that is concentric to the first virtual circle and has a larger radius than the first virtual circle. A first magnetic flux generator is disposed at a position between the first end of the first magnetic flux transmission part and the first end of the second magnetic flux transmission part. A second magnetic flux generator is disposed at a position between the second end of the first magnetic flux transmission part and the second end of the second magnetic flux transmission part. A magnetic flux density detector (i) is disposed on an other of the detection object or the reference part to be movable within the gap relative to the one of the detection object or the reference part and (ii) outputs a signal according to a density of a magnetic flux passing through the magnetic flux density detector. A first magnetic flux collector is disposed on one side of the magnetic flux density detector and facing the first magnetic flux transmission part; and a second magnetic flux collector is disposed on an other side of the magnetic flux density detector and facing the second magnetic flux transmission part in a manner that binds the magnetic flux density detector between the first magnetic flux collector and the second magnetic flux collector. A magnetic resistance of a first magnetic path is defined between the first magnetic flux collector and the first magnetic flux transmission part and a magnetic resistance of a second magnetic path is defined between the second magnetic flux collector and the second magnetic flux transmission part are respectively configured so that the magnetic flux density detector is movable within the gap relative to one of the detection object or the reference part along a circular path that has a radius between a radius of the first virtual circle and a radius of the second virtual circle where a detected magnetic flux density decreases to a minimum.

Further, the first magnetic flux collector is formed so that an intersection between (i) a face which faces the first magnetic flux transmission part and (ii) a virtual plane that includes the first virtual circle has a straight line shape. The second magnetic flux collector is formed so that an intersection between (i) a face which faces the second magnetic flux transmission part and (ii) the virtual plane has a straight line shape. The magnetic flux density detector is disposed at a position that is offset by a predetermined offset distance, from a midpoint between the first magnetic flux transmission part and the second magnetic flux transmission part, and toward the second magnetic flux transmission part along a radial direction of the first virtual circle.

Moreover, the first magnetic flux collector is formed so that an intersection between (i) a face which faces the first magnetic flux transmission part and (ii) a virtual plane that includes the first virtual circle and has a shape that extends along a third virtual circle that is concentric to the first virtual circle and has a radius that is larger than the first virtual circle and smaller than the second virtual circle. The second magnetic flux collector is formed so that an intersection between (i) a face which faces the second magnetic flux transmission part and (ii) the virtual plane has a shape that extends along a fourth virtual circle that is concentric to the first virtual circle and has a radius that is larger than the third virtual circle and smaller than the second virtual circle. The magnetic flux density detector is disposed at a midpoint between the first magnetic flux transmission part and the second magnetic flux transmission part.

In other words, the position detector detects a rotation position of a detection object that rotates relative to a reference part. The position detector includes a first magnetic flux transmission part, a second magnetic flux transmission part, a first magnetic flux generator, a second magnetic flux generator, a magnetic flux density detector, a first magnetic flux collector and a second magnetic flux collector.

The first magnetic flux transmission part is disposed on one of the detection object and the reference part. The first magnetic flux transmission part is formed in a shape that extends along a first virtual circle that is centered on a rotation axis of the detection object. The second magnetic flux transmission part is disposed on one of the detection object or the reference part, so that a gap is formed at a position between the first and second magnetic flux transmission parts. The second magnetic flux transmission part is formed in a shape that extends along a second virtual circle coaxially positioned with and having a larger radius than the first virtual circle.

The first magnetic flux generator is disposed at a position between a first end of the first magnetic flux transmission part and a first end of the second magnetic flux transmission part. Thereby, the magnetic flux generated by the first magnetic flux generator is transmitted from the first end of the first and second magnetic flux transmission parts to a second end of first and second magnetic flux transmission parts.

The second magnetic flux generator is disposed at a position between the second of the first magnetic flux transmission part and the second end of the second magnetic flux transmission part. Thereby, the magnetic flux generated by the second magnetic flux generator is transmitted from the second end of the first and second magnetic flux transmission parts to the one end of first and second magnetic flux transmission parts.

The magnetic flux density detector is disposed on the one of the detection object or the reference part so that the detector is movable relative to the other of the detection object or the reference part in the gap between the first and second magnetic flux transmission parts. The magnetic flux density detector outputs a signal according to a density of the magnetic flux passing through the density detector. In such a structure, the magnetic flux passing through the magnetic flux density detector is, mainly, a spill magnetic flux, which flows through the gap between the first and second magnetic flux transmission parts from one of the two transmission parts to the other (i.e., the magnetic flux flowing either from the first part to the second part or from the second part to the first part).

By devising the above-mentioned configuration, the position detector is enabled to detect a position of the detection object relative to the reference part based on the signal outputted by the magnetic flux density detector.

The first magnetic flux collector is disposed on one side of the density detector which is close to the first magnetic flux transmission part. The second magnetic flux collector is disposed on an other side of the density detector which is close to the second magnetic flux transmission part, with the density detector interposed therebetween. By devising such a structure of the first and second magnetic flux collectors, the spill magnetic flux flowing in the gap between the first and second magnetic flux transmission parts is concentrated to flow to (i.e., to pass through) the density detector. Therefore, the dynamic range of the density of the magnetic flux detected by the magnetic flux density detector is increased, and the position detection accuracy of the position detector is improved.

In the present disclosure, a magnetic resistance of a first magnetic path between the first magnetic flux collector and the first magnetic flux transmission part and a magnetic resistance of a second magnetic path between the second magnetic flux collector and the second magnetic flux transmission part are set so that the magnetic flux density detector is movable within the gap between the first and second magnetic flux transmission parts relative to one of the detection object and the reference part at a radial position in the radial direction of the first virtual circle where the magnetic flux density decreases to a minimum. As a result, a change of the magnetic flux density at the proximity of the density detector according to the shift of the density detector in the radial direction of the virtual circle decreases. Therefore, a change of an output signal from the density detector decreases due to the shift of the density detector in the radial direction of the virtual circle. Thus, robustness of the position detector for the position shift of the density detector is improved. That is, the position detection accuracy for detecting the position of the detection object according to the present disclosure is improved.

BRIEF DESCRIPTION OF THE DRAWINGS

Other objects, features and advantages of the present disclosure become more apparent from the following detailed description disposed with reference to the accompanying drawings, in which.

DETAILED DESCRIPTION

Hereafter, the position detector in plural embodiments of the present disclosure and the actuator using the same are explained based on the drawing. In the plural embodiments, the same numerals are assigned to the same components, and explanation of the same components will not be repeated.

First Embodiment

Figure 1:
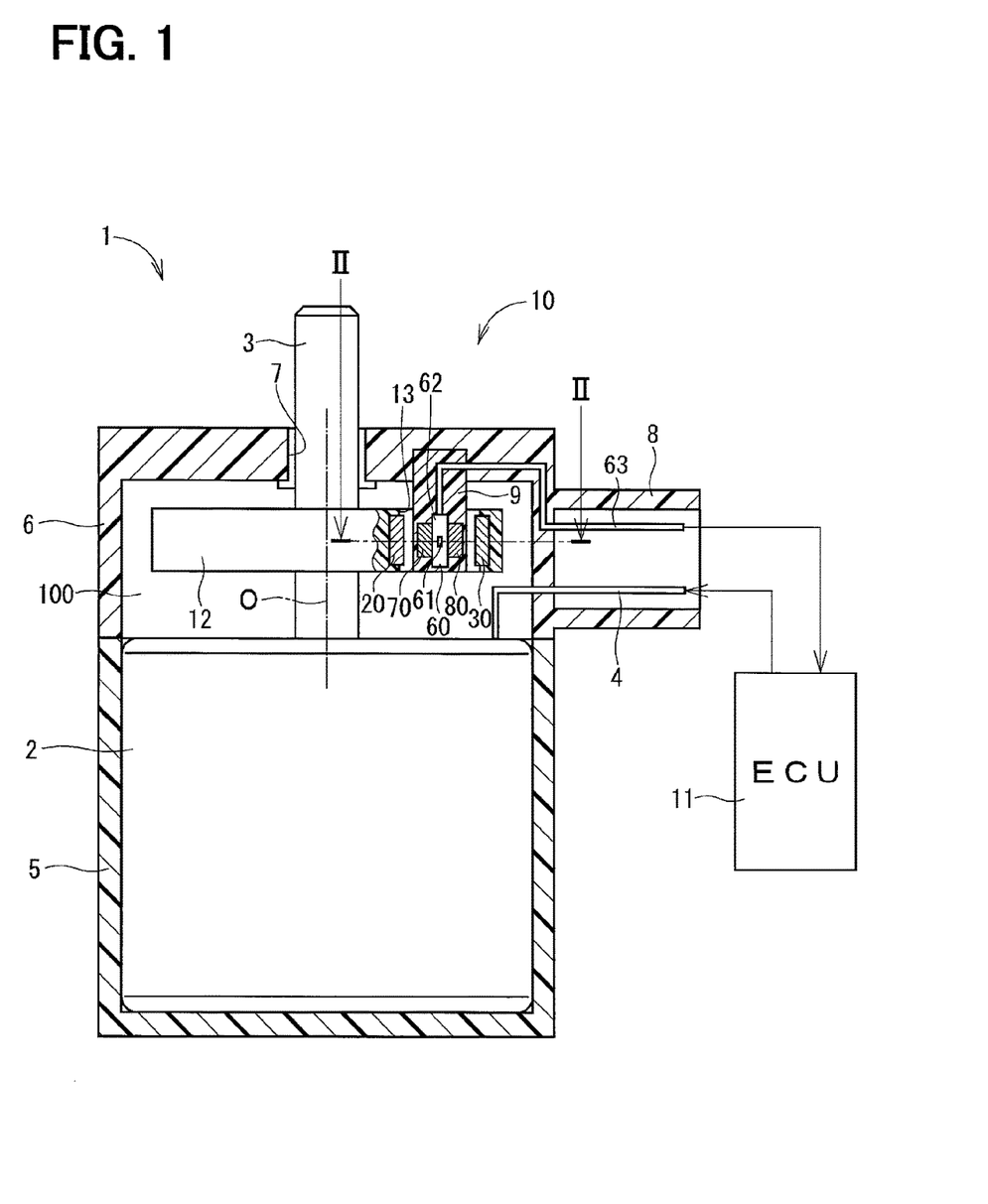
FIG. 1 is a sectional view of a position detector and an actuator in a first embodiment of the present disclosure.
Figure 2A:
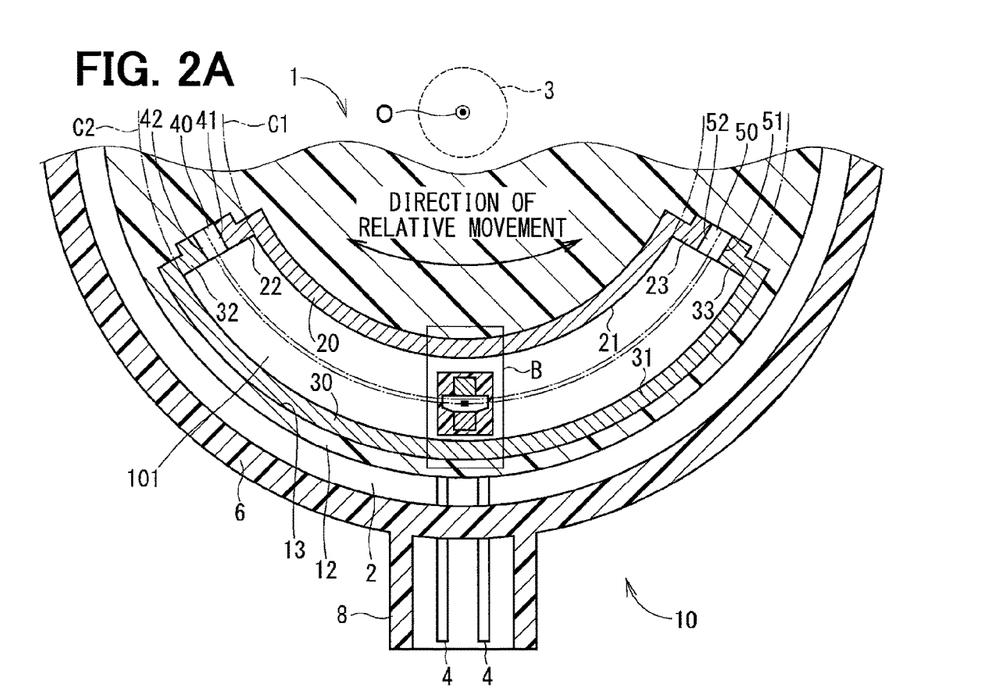
FIG. 2A is a sectional view along a line II-II of FIG. 1.
Figure 2B:
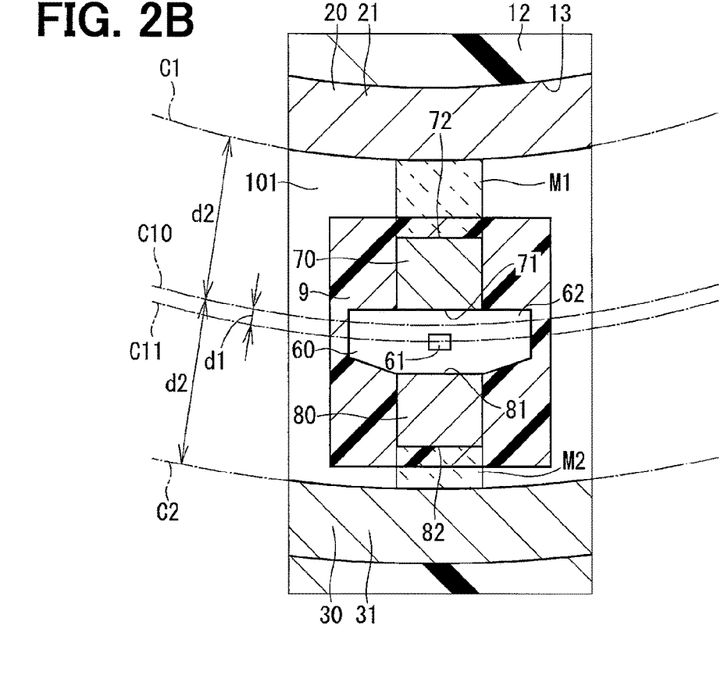
FIG. 2B is an enlarged view of a B portion in FIG. 2A.

The position detector in the first embodiment of the present disclosure and the actuator using the same are shown in FIGS. 1 and 2.

An actuator 1 is used as a driving power source which drives a throttle valve of a vehicle (not illustrated), for example. The actuator 1 is provided with a motor 2, a housing 5, a cover 6, an electronic control unit (hereinafter "ECU") 11, a rotating body 12, a position detector 10, together with other parts.

As shown in FIG. 1, the motor 2 has an output shaft 3, a motor terminal 4 and the like. An electric power is supplied to the motor 2 via the motor terminal 4. The motor 2 rotates by receiving the electric power from the terminal 4. Rotation of the motor 2 is outputted from the output shaft 3. The output shaft 3 is connected to a throttle valve via a geartrain (not illustrated) or the like, for example. Therefore, when the motor 2 rotates, the throttle valve also rotates.

The housing 5 is made of resin to have a cylinder shape with a bottom, for example, and has the motor 2 accommodated in an inside thereof.

The cover 6 is made of resin to have a cylinder shape with a bottom, for example, and has its opening abutted to an opening of the housing 5 in a state that the output shaft 3 is inserted into a cavity 7 which is bored on the bottom of the cover 6. In such manner, a hollow space 100 is defined at a position between the cover 6 and the motor 2.

The cover 6 has a connector 8 formed in a pipe shape and extending in a radial outside direction from a cylinder shape body of the cover 6. In the connector 8, an end of the motor terminal 4 is exposed. The connector 8 is connected to an end of a wire harness leading to the ECU 11. Thereby, the electric power from the battery (not illustrated) is supplied to the motor 2 via the ECU 11, the wire harness, and the motor terminal 4.

The ECU 11 is a computer provided with a CPU serving as a calculation unit together with ROM, RAM serving as a memory unit, an input/output interface and other parts. The ECU 11 controls the operation of the various devices installed in the vehicle based on the signal and the like from various sensors attached to various parts of the vehicle.

The ECU 11 controls the electric power supplied to the motor 2, for example, based on an accelerator opening signal from an accelerator pedal, or the like. When the electric power is supplied to the motor 2, the motor 2 rotates to rotate a throttle valve. Therefore, the throttle valve opens and closes an air intake passage, and an amount of an intake air flowing through the air intake passage is adjusted. In the present embodiment, the ECU 11 may also control a supply of the electric power to the motor 2 by an idle speed control (ISC) function, for example, irrespective of the opening signal from the accelerator pedal.

The rotating body 12 is, for example, made of resin to have a disk shape, and is disposed in the hollow space 100. The rotating body 12 is being fixed onto the output shaft 3 with the output shaft 3 extending therethrough at its center. Therefore, when the output shaft 3 rotates, the rotating body 12 rotates together with the output shaft 3. Since the output shaft 3 and the throttle valve are connected by the geartrain, the rotation position of the rotating body 12 corresponds to the rotation position of the throttle valve.

According to the present embodiment, the position detector 10 detects the rotation position of the rotating body 12 that moves, i.e., rotates, relative to the cover 6. Therefore, by detecting the rotation position of the rotating body 12 which rotates relative to the cover 6, the rotation position of the throttle valve is detected and an opening degree of the throttle valve is also detected. Thus, the position detector 10 is capable of serving as a throttle position sensor.

As shown in FIG. 1 and FIGS. 2A and 2B, the position detector 10 includes a first magnetic flux transmission part 20, a second magnetic flux transmission part 30, a magnet 40 serving as a first magnetic flux generator, a magnet 50 serving as a second magnetic flux generator, a Hall IC 60 serving as a magnetic flux density detector, a first magnetic flux collector 70, a second magnetic flux collector 80, together with other parts.

The first magnetic flux transmission part 20 is made of a material which has a relatively high magnetic permeability, such as a silicon steel, or the like. The first magnetic flux transmission part 20 is disposed in an arc-shape cavity 13 that is formed on the rotating body 12.

The first magnetic flux transmission part 20 has a center section 21, a first end 22, and a second end 23. The center section 21 has a shape which extends along a first virtual circle C1 that centers on a rotation axis O of the rotating body 12 (refer to FIG. 2A). More specifically, a face of the center section 21, which is on an opposite side relative to the rotation axis O, is formed to extend along the first virtual circle C1. The first end 22 is formed to extend from one end of the center section 21 toward a radial outside of the first virtual circle C1. The second end 23 is formed to extend from the other end of the center section 21 toward the radial outside of the first virtual circle C1.

The second magnetic flux transmission part 30 is made of the material which has a relatively high magnetic permeability, such as a silicon steel or the like, similar to the first magnetic flux transmission part 20. The second magnetic flux transmission part 30 is disposed in the cavity 13 that is formed on the rotating body 12.

The second magnetic flux transmission part 30 has a center section 31, a first end 32, and a second end 33. The center section 31 has a shape which extends along a second virtual circle C2 that has a larger radius than the first virtual circle C1 and centers on the rotation axis O of the rotating body 12 (refer to FIG. 2A). More specifically, the face of the center section 21, which is on an axis-facing side facing the rotation axis O, is formed to extend along the second virtual circle C2. The first end 32 is formed to extend from one end of the center section 31 toward a radial inside of the second virtual circle C2. The second end 33 is formed to extend from the other end of the center section 31 to the radial inside of the second virtual circle C2.

As shown in FIGS. 1 and 2, the first magnetic flux transmission part 20 and the second magnetic flux transmission part 30 are disposed in the cavity 13 of the rotating body 12 so that the center section 21 of the first magnetic flux transmission part 20 and the center section 31 of the second magnetic flux transmission part 30 face each other in the radial direction of the first virtual circle C1. Thereby, an arc-shape gap 101 is formed between the center section 21 of the first magnetic flux transmission part 20 and the center section 31 of the second magnetic flux transmission part 30 (refer to FIG. 2A).

The magnet 40 is a permanent magnet, such as a neodymium magnet, a ferrite magnet, or the like, for example. The magnet 40 has a magnetic pole 41 on one end, and has a magnetic pole 42 on the other end. The magnet 40 is magnetized so that a magnetic pole 41 side serves as an N pole, and a magnetic pole 42 side serves as an S pole. The magnet 40 is disposed at a position between the first end 22 of the first magnetic flux transmission part 20 and the first end 32 of the second magnetic flux transmission part 30 so that the magnetic pole 41 abuts the first end 22 of the first magnetic flux transmission part 20, and the magnetic pole 42 abuts the first end 32 of the second magnetic flux transmission part 30. Thereby, the magnetic flux generated by the magnetic pole 41 of the magnet 40 is transmitted from the first end 22 of the first magnetic flux transmission part 20 to the second end 23 via the center section 21.

The magnet 50 is also a permanent magnet, such as a neodymium magnet, a ferrite magnet, or the like, for example, similar to the magnet 40. The magnet 50 has a magnetic pole 51 on one end, and has a magnetic pole 52 on the other end. The magnet 50 is magnetized so that a magnetic pole 51 side serves as an N pole, and a magnetic pole 52 side serves as an S pole. The magnet 50 is disposed at a position between the second end 33 of the second magnetic flux transmission part 30 and the second end 23 of the first magnetic flux transmission part 20 so that the magnetic pole 51 abuts the second end 33 of the second magnetic flux transmission part 30, and the magnetic pole 52 abuts the second end 23 of the first magnetic flux transmission part 20. Thereby, the magnetic flux generated by the magnetic pole 51 of the magnet 50 is transmitted from the second end 33 of the second magnetic flux transmission part 30 to the first end 32 via the center section 31.

Here, the spill magnetic flux flows through the gap 101, either from the first magnetic flux transmission part 20 to the second magnetic flux transmission part 30, or from the second magnetic flux transmission part 30 to the first magnetic flux transmission part 20.

In the present embodiment, the magnet 40 and the magnet 50 are configured to be the same permanent magnet having the same volume, the same type, the same material configuration, and the same magnetization adjustment method. Therefore, the spill magnetic flux flows from the second magnetic flux transmission part 30 to the first magnetic flux transmission part 20 in an area between a longitudinal center position of the gap 101 and the magnet 50, and the spill magnetic flux flows from the first magnetic flux transmission part 20 to the second magnetic flux transmission part 30 in an area between the longitudinal center position and the magnet 40. More specifically, the closer the position along the longitudinal direction of the gap 101 is to the magnet 40 or to the magnet 50, the greater an absolute value of the magnetic flux density becomes. Further, the magnetic flux density is equal to 0 at the longitudinal center position of the gap 101.

Further, the spill magnetic flux at positions around the magnet 40 "flies" from the magnetic pole 41 to the magnetic pole 42, and the (spill) magnetic flux at positions around the magnet 50 "flies" from the magnetic pole 51 to the magnetic pole 52.

The Hall IC 60 has a Hall element 61 serving as a signal output element, as well as a sealer 62, a sensor terminal 63 and the like. The Hall element 61 outputs a signal according to the density of the magnetic flux passing therethrough. The sealer 62 is made of resin and has a rectangular board shape, for example. A first end of the sensor terminal 63 is connected to the Hall element 61. The sealer 62 covers an entire Hall element 61, as well as the first end side of the sensor terminal 63. In this case, the Hall element 61 is located at the center of the sealer 62.

The sealer 62 that seals the Hall IC 60 and the first end side of the sensor terminal 63 are molded by a mold 9. The mold 9 is a resin mold, for example, and has a square pole shape. The sealer 62 that seals the Hall IC 60 is molded at a position on one end side of the mold 9.

The mold 9 is disposed on the cover 6 so that one end of the mold 9 is positioned in the gap 101 and the other end of the mold 9 is connected to the bottom of the cover 6. In such manner, the Hall IC 60 is rotatably movable, relative to the rotating body 12, in the gap 101 between the first magnetic flux transmission part 20 and the second magnetic flux transmission part 30. The cover 6 and the mold 9 are respectively equivalent to a reference part in the claims, and the rotating body 12 is equivalent to a detection object in the claims.

The sensor terminal 63 of the Hall IC 60 has a second end formed to be exposed in an inside of the connector 8 of the cover 6 by an insert-molding method with the cover 6. Therefore, when an end of the wire harness leading to the ECU 11 is connected to the connector 8, the Hall element 61 of the Hall IC 60 is connected to the ECU 11. Thereby, a signal from the Hall element 61 is transmitted to the ECU 11.

In this case, the magnetic flux passing through the Hall element 61 of the Hall IC 60 is mainly made of the spill magnetic flux which flows through the gap 101 between the first magnetic flux transmission part 20 and the second magnetic flux transmission part 30 either (i) from the second magnetic flux transmission part 30 to the first magnetic flux transmission part 20, or (ii) from the first magnetic flux transmission part 20 to the second magnetic flux transmission part 30.

In the present embodiment, the spill magnetic flux flows from the first magnetic flux transmission part 20 to the second magnetic flux transmission part 30 in an area between the longitudinal center position of the gap 101 and the magnet 40 as mentioned above, and the spill magnetic flux flows from the second magnetic flux transmission part 30 to the first magnetic flux transmission part 20 in an area between the longitudinal center position of the gap 101 and the magnet 50. Further, when a position along the longitudinal direction of the gap 101 is closer to the magnet 40 or to the magnet 50, the greater the absolute value of the magnetic flux density becomes.

Therefore, if assumed that a flow direction of the spill magnetic flux flowing from the second magnetic flux transmission part 30 to the first magnetic flux transmission part 20 is a negative direction, when a position of the Hall IC 60 rotatably moves from a proximity of the magnet 50 to a proximity of the magnet 40 in the gap 101, the magnetic flux density monotonically increases from a negative value to a positive value, thereby (i) uniquely identifying a rotation position of the Hall IC 60 according to the detected magnetic flux density, and (ii) outputting a signal that is uniquely identified according to the rotation position of the Hall IC 60.

According to the above-mentioned configuration, the ECU 11 is capable of detecting the rotation position of the rotating body 12 relative to the cover 6 based on the signal outputted from the Hall IC 60. In such manner, the rotation position and an opening degree of the throttle valve are detected.

The first magnetic flux collector 70 is made of a relatively high magnetic magnetically permeable such as a permalloy or the like, and has a hexahedron body. The first magnetic flux collector 70 is disposed on a first side of the mold 9 so that an abutting face 71 of the collector 70 faces or abuts a center of a face on a first magnetic flux transmission part 20 side of the sealer 62 of the Hall IC 60. An opposite face 72 of the first magnetic flux collector 70, which is on a side opposite to the abutting face 71 with respect to the first magnetic flux collector 70, faces the center section 21 of the first magnetic flux transmission part 20.

The second magnetic flux collector 80 is, similar to the first magnetic flux collector 70, made of a relatively high magnetically permeable material such as a permalloy or the like, and has a hexahedron body. The second magnetic flux collector 80 is disposed on a second side of the mold 9 so that an abutting face 81 of the collector 80 faces or abuts a center of a face on a second magnetic flux transmission part 30 side of the sealer 62 of the Hall IC 60. An opposite face 82 of the second magnetic flux collector 80, which is on a side opposite to the abutting face 81 with respect to the second magnetic flux collector 80, faces the center section 31 of the second magnetic flux transmission part 30.

Thus, the Hall IC 60 is sandwiched or bound in between the first magnetic flux collector 70 and the second magnetic flux collector 80, and such sandwiching or binding direction is substantially the same as the facing direction of facing between the first magnetic flux transmission part 20 and the second magnetic flux transmission part 30. The spill magnetic flux which flows through the gap 101 between the first magnetic flux transmission part 20 and the second magnetic flux transmission part 30 is concentrated in such manner, and the concentrated magnetic flux is directed to flow to (i.e., to pass through) the Hall IC 60.

Figure 3:
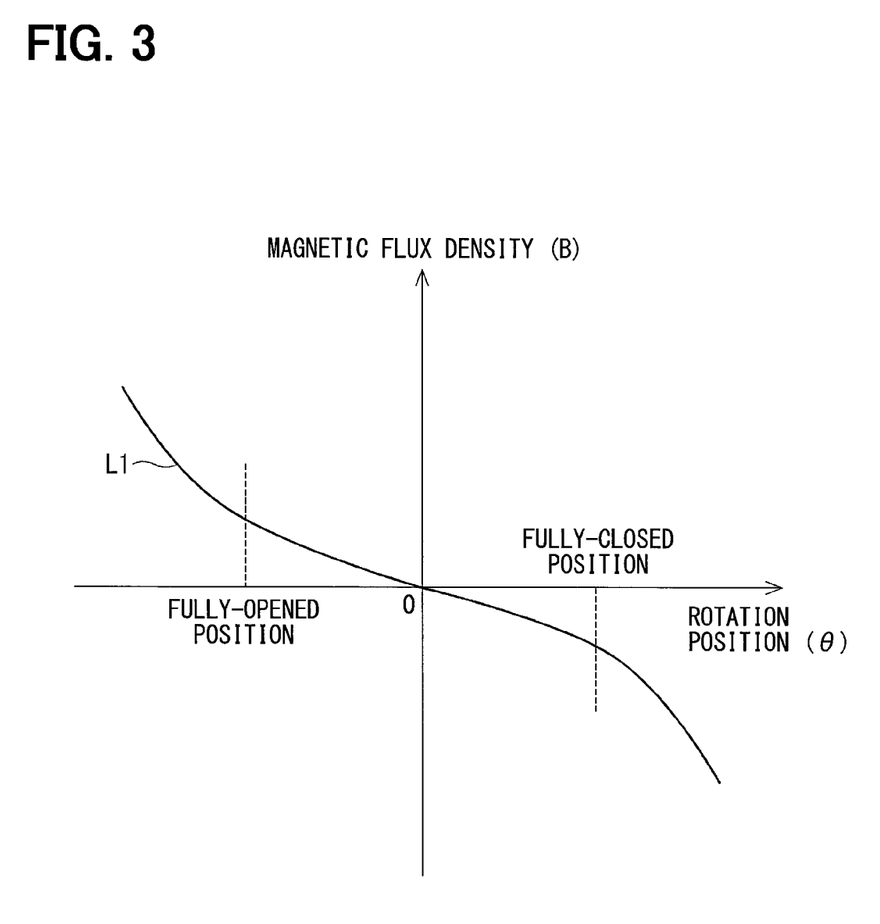
FIG. 3 is a diagram of a relationship between a magnetic flux density detected by a magnetic flux density detector and a rotation position of a first virtual circle in a gap in the first embodiment of the present disclosure.

According to the present embodiment, the magnetic flux density detected by the Hall IC 60 is shown by a line L1 in FIG. 3. In addition to the spill magnetic flux which flows from the first magnetic flux transmission part 20 to the second magnetic flux transmission part 30, the magnetic flux which flies from the magnetic pole 41 to the magnetic pole 42 of the magnet 40 and the magnetic flux which flies from the magnetic pole 51 to the magnetic pole 52 of the magnet 50 flow at the proximity of the magnet 40 and the magnet 50 in the gap 101. Therefore, the change rate of the absolute value of the magnetic flux represented by the line L1 increases toward the both end parts of the gap 101.

In the present embodiment, the relationship between the magnetic flux density and the movable range of the rotating body 12 (i.e., a range from the full-close position to a full-open position of the throttle valve) is shown in FIG. 3. That is, in the present embodiment, the position detection of the rotating body 12 is performed in a range where the line L1 has a relatively high linearity.

As shown in FIG. 2B, the first magnetic flux collector 70 is formed so that an intersection between (i) the opposite face 72 which faces the center section 21 of the first magnetic flux transmission part 20 and (ii) a virtual plane that includes the first virtual circle C1 has a straight line shape. That is, the opposite face 72 is a flat planar surface.

The second magnetic flux collector 80 is formed so that an intersection between (i) the opposite face 82 which faces the center section 31 of the second magnetic flux transmission part 30 and (ii) the above-described virtual plane has a straight line shape. That is, the opposite face 82 is a flat planar surface.

Further, the Hall IC 60 (i.e., a Hall element 61) is disposed to be movable relative to the rotating body 12 at a position that is offset from a midpoint between the center section 21 of the first magnetic flux transmission part 20 and the center section 31 of the second magnetic flux transmission part 30 by a predetermined offset distance d1 toward the center section 31 along a radial direction of the first virtual circle C1. That is, in other words, the Hall IC 60 (i.e., a Hall element 61) is disposed in the mold 9 to be movable along a virtual circle C11 that has a larger radius than a virtual circle C10 by a predetermined offset distance d1, when the circle C10 is equi-distant from both of the first and second virtual circles C1, C2 by a same distance d2.

Figure 4:
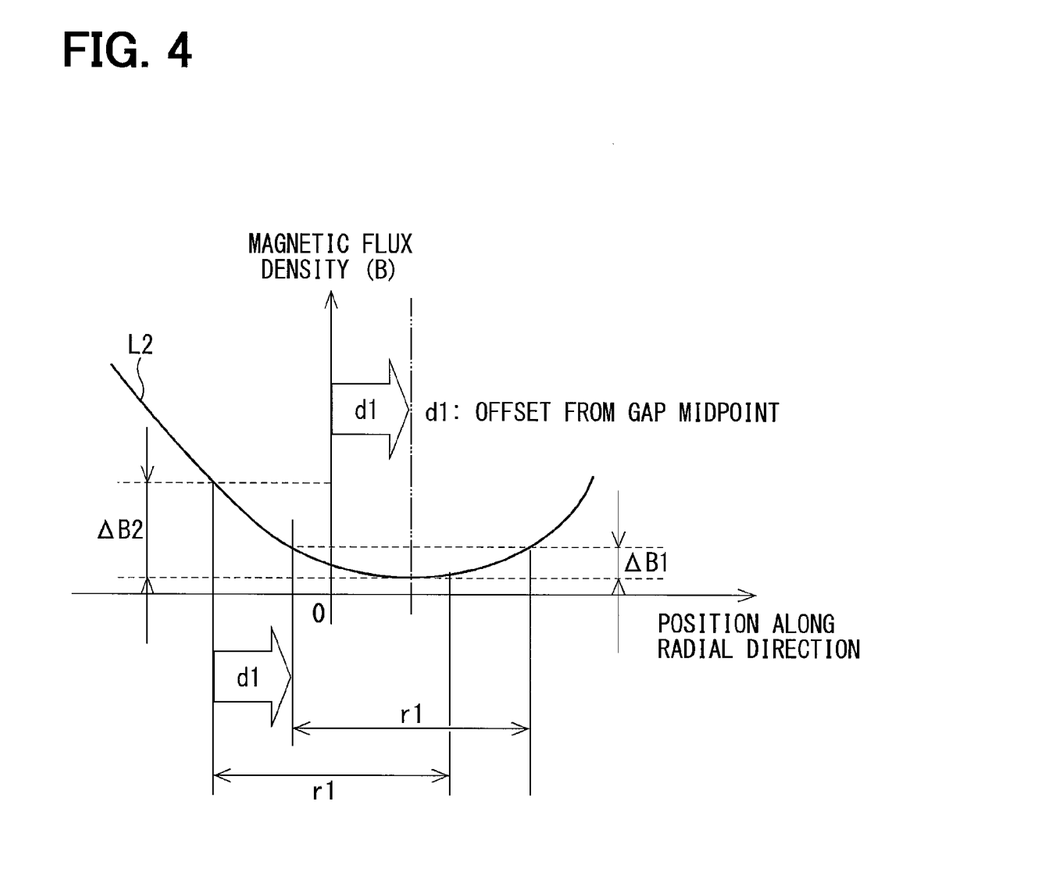
FIG. 4 is a diagram of a relationship between (i) the magnetic flux density detected by the magnetic flux density detector of the first embodiment of the present disclosure and of a comparative example and (ii) a radial direction position of the first virtual circle in the gap.

The relationship between (i) a detected magnetic flux density by the Hall IC 60 (i.e., a Hall element 61) of the present embodiment and (ii) a radial direction position of the first virtual circle C1 in the gap 101 is shown in FIG. 4. In the present embodiment, a face on a first collector 70 side of the center section 21 of the first magnetic flux transmission part 20 has a surface with a curved shape that extends along the first virtual circle C1, and the opposite face 72 of the first magnetic flux collector 70 has a flat, planar shape. A face on a second collector 80 side of the center section 31 of the second magnetic flux transmission part 30 has a surface with a curved shape that extends along the second virtual circle C2, and the opposite face 82 of the second magnetic flux collector 80 has a flat, planar shape. Therefore, when the Hall IC 60 (i.e., a Hall element 61) is positioned at the midpoint (i.e., on the virtual circle C10) between the center section 21 of the first magnetic flux transmission part 20 and the center section 31 of the second magnetic flux transmission part 30, which is designated as a position 0 along the radial direction in FIG. 4, the detected magnetic flux density does not decrease to a minimum.

Thus, as mentioned above, by disposing the Hall IC 60 (i.e., a Hall element 61) to be movable relative to the rotating body 12 at a position that is offset from a midpoint between the center section 21 of the first magnetic flux transmission part 20 and the center section 31 of the second magnetic flux transmission part 30 by the predetermined offset distance d1 toward the center section 31 along a radial direction of the first virtual circle C1, a magnetic resistance of a first magnetic path M1, which is a path between the first magnetic flux collector 70 and the first magnetic flux transmission part 20, and a magnetic resistance of a second magnetic path M2, which is a path between the second magnetic flux collector 80 and the second magnetic flux transmission part 30, are configured in the present embodiment so that the Hall IC 60 is movable within the gap 101 relative to the rotating body 12 at a radial position, which is a position on a line that extends along the radial direction of the first virtual circle C1 (i.e., on a radius of C1), where the detected magnetic flux density decreases to a minimum.

By devising the above-mentioned configuration, the detected magnetic flux density error decreases to an error ΔB1, even when a position of the Hall IC 60 (i.e., a Hall element 61) is shifted in the gap 101 along the radial direction of the first virtual circle C1 within a width r1, (refer to FIG. 4).

The advantageous effects of the position detector in the present embodiment are clarified in view of a comparative example.

Figure 5:
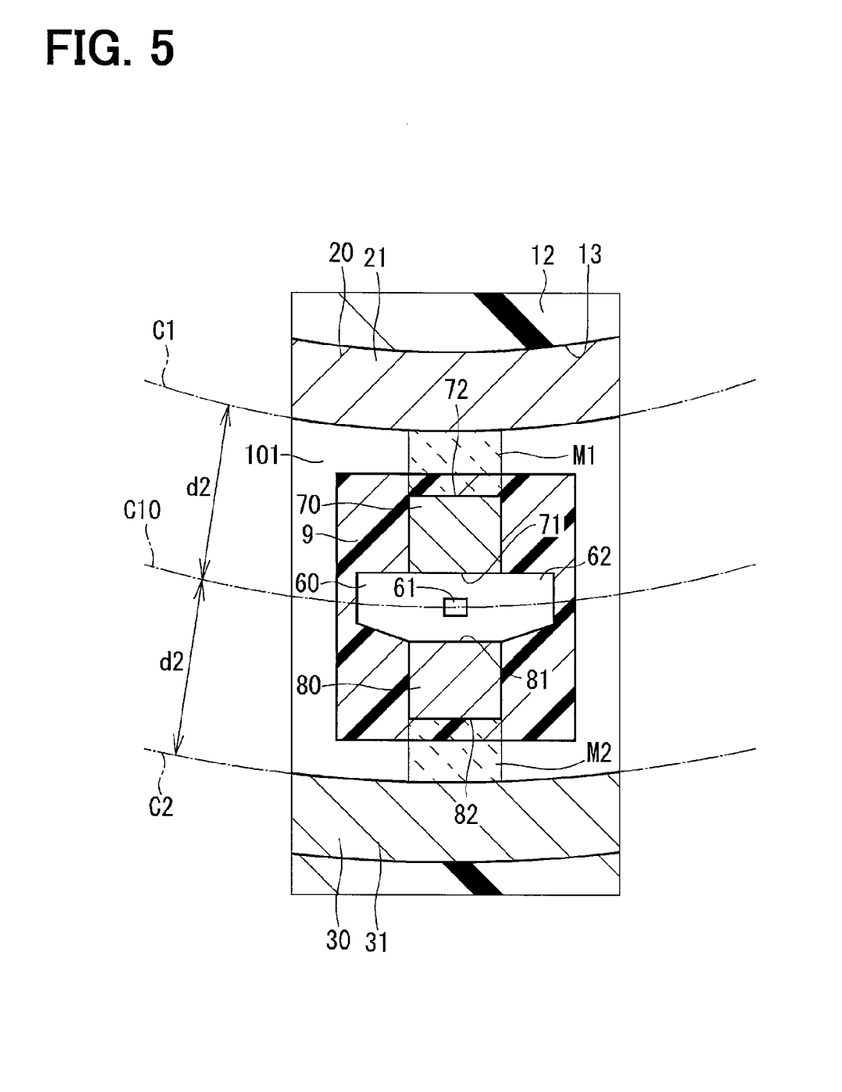
FIG. 5 is an enlarged view at a proximity of the magnetic flux density detector in the comparative example.

As shown in FIG. 5, the Hall IC 60 in the comparative example is disposed for allowing the Hall element 61 to be movable relative to the rotating body 12 at a midpoint between the center section 21 of the first magnetic flux transmission part 20 and the center section 31 of the second magnetic flux transmission part 30. Therefore, the Hall IC 60 is disposed in the mold 9 for allowing the Hall element 61 to be movable on the virtual circle C10, which is equi-distant from both of the first and second virtual circles C1, C2 by the same distance d2.

When a position of the Hall IC 60 (i.e., the Hall element 61) in the comparative example is shifted in the gap 101 along the radial direction of the first virtual circle C1 within the width r1, the detected magnetic flux density error decreases from an error ΔB2 of the comparative example to the error ΔB1 of the present embodiment (refer to FIG. 4). That is, as shown in FIG. 4, when the Hall IC 60 (i.e., a Hall element 61) is offset by the predetermined offset distance d1, the width r1 is offset by the predetermined offset distance d1. As such, the detected magnetic flux density error decreases to from the error ΔB2 of the comparative example to the error ΔB1 of the present embodiment.

As readily understood by a comparison in a graph of FIG. 4, since the error of the detected magnetic flux density in the present embodiment is smaller than the error in the comparative example when the position of the Hall IC 60 (i.e., the Hall element 61) is shifted in the gap 101 along the radial direction of the first virtual circle C1, the present embodiment is advantageous over the comparative example.

As explained above, in the present embodiment, the first magnetic flux collector 70 is formed so that an intersection between (i) the opposite face 72 which faces the center section 21 of the first magnetic flux transmission part 20 and (ii) a virtual plane that includes the first virtual circle C1 has a straight line shape. The second magnetic flux collector 80 is formed so that an intersection between (i) the opposite face 82 which faces the center section 31 of the second magnetic flux transmission part 30 and (ii) the above-described virtual plane has a straight line shape. Further, the Hall IC 60 (i.e., a Hall element 61) is disposed to be movable relative to the rotating body 12 at a position that is offset from the midpoint between the first magnetic flux transmission part 20 and the second magnetic flux transmission part 30 by the predetermined offset distance d1 toward the second magnetic flux transmission part 30 along the radial direction of C1.

In such manner, the magnetic resistance of the first magnetic path M1 and the magnetic resistance of the second magnetic path M2 are configured so that the Hall IC 60 (i.e., the Hall element 61) is movable within the gap 101 relative to the rotating body 12 along a circular path at a radial position (i.e., at a predetermined radius) where the detected magnetic flux density decreases to a minimum. In other words, the Hall IC 60 is movable within the gap relative to the rotating body 12 along a circular path that has a radius between a radius of the first virtual circle (C1) and a radius of the second virtual circle (C2), where a detected magnetic flux density decreases to a minimum. Therefore, the change of the magnetic flux density at the proximity of the Hall IC 60 (i.e., the Hall element 61) is reduced for the same amount of position shift of the Hall IC 60 (i.e., the Hall element 61) along the radius of C1 in comparison to, for example, the comparative example. Therefore, the change of an output signal due to the position shift of the Hall IC 60 (i.e., the Hall element 61) along the radial direction of the first virtual circle C1 is reduced. As a result, robustness of the position detector for the position shift of its component, i.e., the magnetic flux density detector, is improved. That is, in other words, the position detection accuracy for detecting the position of the rotating body 12 (i.e., a throttle valve) is improved.

Second Embodiment

Figure 6:
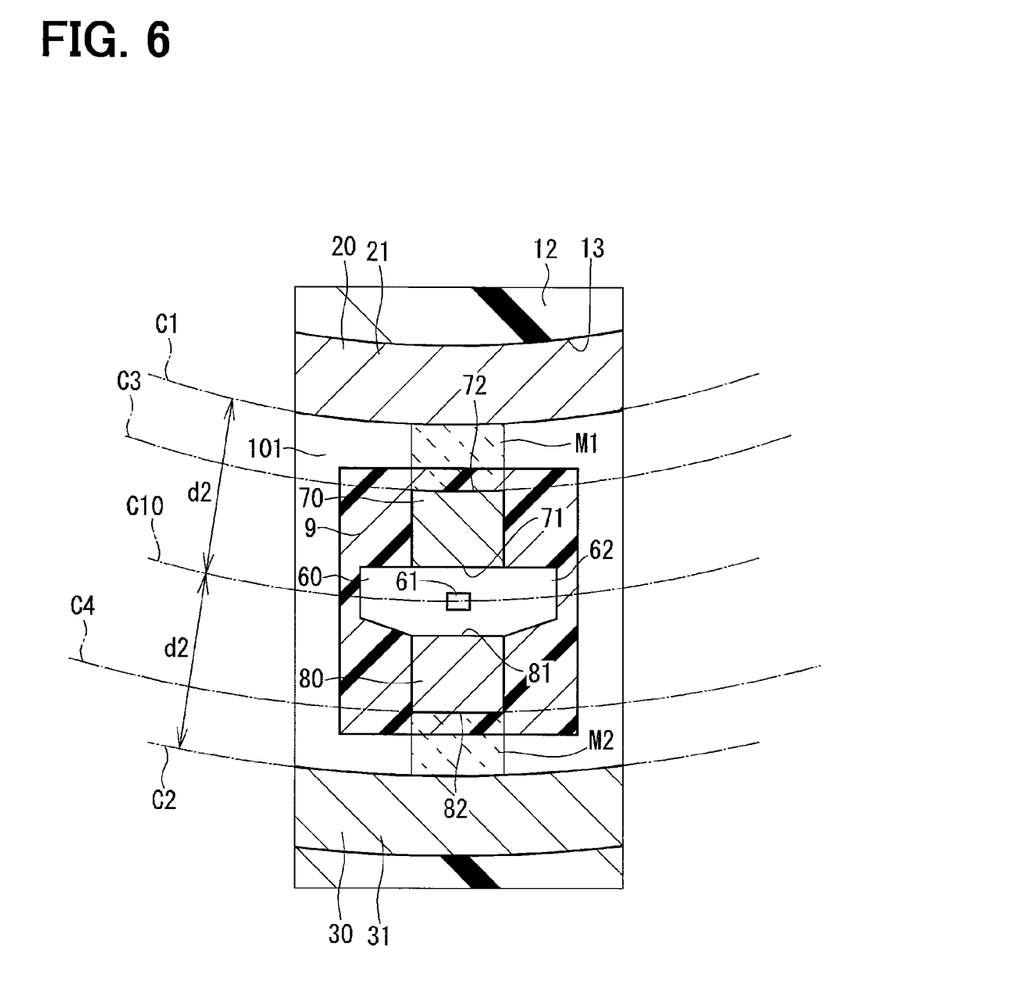
FIG. 6 is an enlarged view of the position detector at a proximity of the magnetic flux density detector in a second embodiment of the present disclosure.

A part of the position detector in the second embodiment of the present disclosure is shown in FIG. 6. The detector in the second embodiment differs from the one in the first embodiment in the shape of the first and second magnetic flux collectors.

In the second embodiment, the first magnetic flux collector 70 is formed so that an intersection between (i) the opposite face 72 which faces the center section 21 of the first magnetic flux transmission part 20 and (ii) the virtual plane that includes the first virtual circle C1 has a shape that extends along a third virtual circle C3 that is coaxially disposed with the first virtual circle C1 and has a radius being larger than C1 and smaller than C2. That is, the opposite face 72 has a curved surface shape.

The second magnetic flux collector 80 is formed so that an intersection between (i) the opposite face 82 which faces the center section 31 of the second magnetic flux transmission part 30 and (ii) the above-described virtual plane has a shape that extends along a fourth virtual circle C4 that is coaxially disposed with C1 and has a radius being larger than C3 and smaller than C2. That is, the opposite face 82 has a curved surface shape.

According to the present embodiment, the Hall IC 60 (i.e., the Hall element 61) is disposed to be movable relative to the rotating body 12 at a midpoint between the center section 21 of the first magnetic flux transmission part 20 and the center section 31 of the second magnetic flux transmission part 30. That is, the Hall IC 60 (i.e., the Hall element 61) is disposed in the mold 9 so that it is movable on the virtual circle C10 that is positioned equi-distantly at the same distance d2 from both of C1 and C2.

Figure 7:
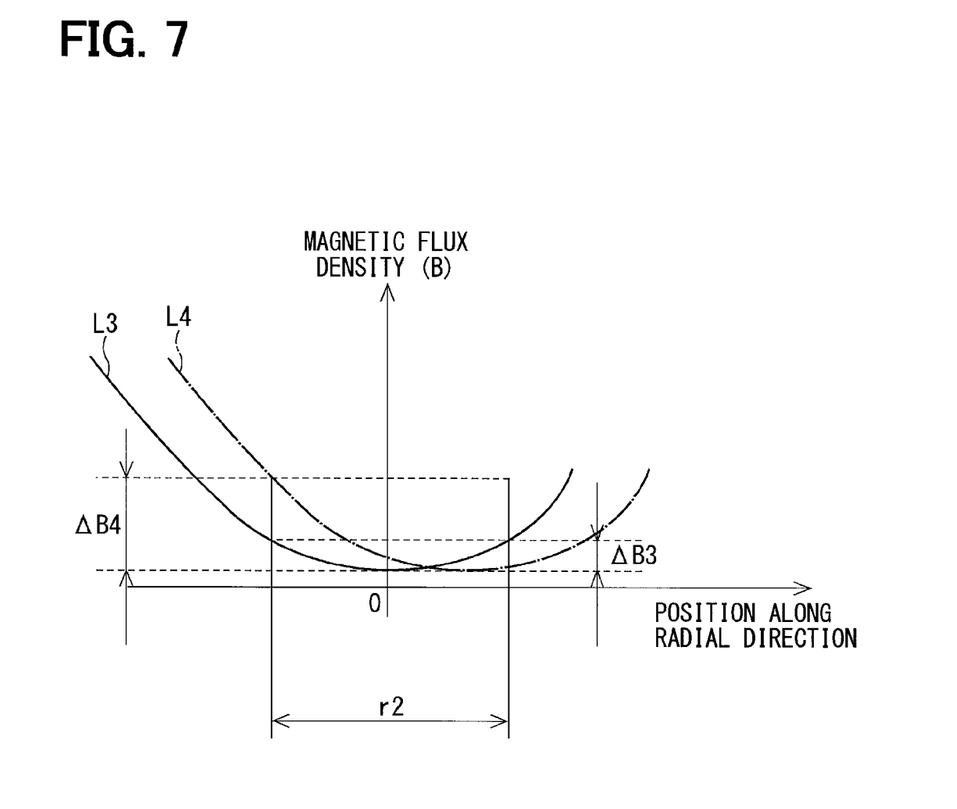
FIG. 7 is a relationship between (i) the magnetic flux density detected by the magnetic flux density detector of the second embodiment of the present disclosure and of the comparative example and (ii) the radial direction position of the first virtual circle in the gap.

A relationship between (i) the detected magnetic flux density detected by the Hall IC 60 (i.e., the Hall element 61) of the present embodiment and (ii) the radial direction position of the first virtual circle C1 in the gap 101 is shown in FIG. 7 as a line L3. In the present embodiment, as mentioned above, the opposite face 72 of the first magnetic flux collector 70 and the opposite face 82 of the second magnetic flux collector 80 have the curved surface shape to extend along the third or fourth virtual circle C3, C4, and the Hall IC 60 (i.e., the Hall element 61) is disposed to be movable relative to the rotating body 12 at the midpoint between the center section 21 of the first magnetic flux transmission part 20 and the center section 31 of the second magnetic flux transmission part 30. Based on such a structure, the magnetic resistance of the first magnetic path M1, which is a path between the first magnetic flux collector 70 and the first magnetic flux transmission part 20, and the magnetic resistance of the second magnetic path M2, which is a path between the second magnetic flux collector 80 and the second magnetic flux transmission part 30, are configured so that the Hall IC 60 (i.e., the Hall element 61) is movable within the gap 101 relative to the rotating body 12 along a circular path at a radial position (i.e., at a predetermined radius) where the detected magnetic flux density decreases to a minimum.

By devising the above-mentioned configuration, even when a position of the Hall IC 60 (i.e., the Hall element 61) is shifted within the gap 101 along the radial direction of the first virtual circle C1 within a width r2, the detected magnetic flux density error decreases to an error ΔB3 of the present embodiment (refer to FIG. 7).

The relationship between (i) the detected magnetic flux density detected by the Hall IC 60 (i.e., the Hall element 61) in the above-mentioned comparative example and (ii) the radial direction position of the first virtual circle C1 in the gap 101 is shown in FIG. 7 by a line L4. When a position of the Hall IC 60 (i.e., the Hall element 61) in the comparative example is shifted in the gap 101 along the radial direction of the first virtual circle C1 within the width r2, the detected magnetic flux density error decreases from an error ΔB4 of the comparative example to the error ΔB3 of the present embodiment (refer to FIG. 7). That is, as shown in FIG. 7, when the opposite face 72 of the first magnetic flux collector 70 and the opposite face 82 of the second magnetic flux collector 80 have curved surface shapes, the radial direction position Line L4 of the comparative example is shifted to the radial direction position Line L3 of the present embodiment. As such, the detected magnetic flux density error decreases from the error ΔB4 of the comparative example to the error ΔB3 of the present embodiment.

As readily understood by a comparison in a graph of FIG. 7, since the error of the detected magnetic flux density in the present embodiment is less than the error in the comparative example when the position of the Hall IC 60 (i.e., the Hall element 61) is shifted in the gap 101 along the radial direction of the first virtual circle C1, the present embodiment is advantageous over the comparative example.

Further, due to a positioning of the Hall IC 60 (i.e., the mold 9) that is disposed at the midpoint between the center section 21 of the first magnetic flux transmission part 20 and the center section 31 of the second magnetic flux transmission part 30, the present embodiment is advantageous over the first embodiment, in which a position of the Hall IC 60 (i.e., the mold 9) that is offset from the above-mentioned midpoint by a predetermined offset distance toward the second magnetic flux transmission part 30. That is, the present embodiment avoiding such a shift of the detector position (i.e., the shift of the mold 9) is advantageous in terms of the reduction of the inter-parts interference at the time of assembly in comparison to the first embodiment.

As explained above, in the present embodiment, the first magnetic flux collector 70 is formed so that the intersection between (i) the opposite face 72 which faces the center section 21 of the first magnetic flux transmission part 20 and (ii) the virtual plane that includes the first virtual circle C1 has a shape that extends along the third virtual circle C3 that is coaxially disposed with the first virtual circle C1 and has a radius that is larger than C1 and smaller than C2. The second magnetic flux collector 80 is formed so that the intersection between (i) the opposite face 82 which faces the center section 31 of the second magnetic flux transmission part 30 and (ii) the above-described virtual plane has a shape that extends along the fourth virtual circle C4 that is coaxially disposed with C1 and has a radius that is larger than C3 and smaller than C2. Further, the Hall IC 60 (i.e., the Hall element 61) is disposed to be movable relative to the rotating body 12 at the midpoint between the first magnetic flux transmission part 20 and the second magnetic flux transmission part 30.

Based on such a structure, the magnetic resistance of the first magnetic path M1 and the magnetic resistance of the second magnetic path M2 are configured so that the Hall IC 60 (i.e., the Hall element 61) is movable within the gap 101 relative to the rotating body 12 along a circular path at a radial position (i.e., at a predetermined radius) where the detected magnetic flux density decreases to a minimum. Therefore, the change of the magnetic flux density at the proximity of the Hall IC 60 (i.e., the Hall element 61) is reduced for the same amount of position shift of the Hall IC 60 (i.e., the Hall element 61) along the radius of C1 in comparison to, for example, the comparative example. Therefore, the change of an output signal due to the position shift of the Hall IC 60 (i.e., the Hall element 61) along the radial direction of the first virtual circle C1 is reduced. As a result, robustness of the position detector against the position shift of the density detector is improved. That is, the position detection accuracy for detecting the position of the rotating body 12 (i.e., a throttle valve) is improved.

Other Embodiments

In the above-mentioned embodiments, the first magnetic flux transmission part, the second magnetic flux transmission part, the first magnetic flux generator, and the second magnetic flux generator are disposed on the detection object, and the magnetic flux density detector is disposed on the reference part. On the other hand, in other embodiments of the present disclosure, the first magnetic flux transmission part, the second magnetic flux transmission part, the first magnetic flux generator, and the second magnetic flux generator may be disposed on the reference part, and the magnetic flux density detector may be disposed on the detection object.

Further, in other embodiments of the present disclosure, the curved surface shape of the first magnetic flux collector 70 and the second magnetic flux collector 80 may have, for example, spherical surface shapes, 3-dimensional surface shapes, or the like.

In other embodiments of the present disclosure, the polarity of the magnet disposed at a position between the both ends of the first magnetic flux transmission part and the second magnetic flux transmission part may be flipped or reversed from the one in the above-described embodiments.

Further, in other embodiments of the present disclosure, the motor may have a speed reducer which reduces the number of rotations to be transmitted to the output shaft.

Moreover, in other embodiments of the present disclosure, an actuator may be used, for example, as a driving power source of various devices, such as a wastegate valve operation device, a variable vane control device of a variable capacity turbocharger, a valve operation device of an exhaust throttle or an exhaust switch valve, a valve operation device of a variable air intake mechanism, and the like.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:
1. A position detector configured to detect a position of a detection object that moves relative to a reference part, the position detector comprising:
    a first magnetic flux transmission part disposed on one of the detection object or the reference part, the first magnetic flux transmission part having a first end, a second end, and a shape that extends along a first virtual circle concentric to a rotation axis of the detection object;

a second magnetic flux transmission part disposed to define a gap between the first magnetic flux transmission part and the second magnetic flux transmission part, the second magnetic flux transmission part having a first end, a second end, and a shape that extends along a second virtual circle that is concentric to the first virtual circle and has a larger radius than the first virtual circle;

a first magnetic flux generator disposed at a position between the first end of the first magnetic flux transmission part and the first end of the second magnetic flux transmission part;

a second magnetic flux generator disposed at a position between the second end of the first magnetic flux transmission part and the second end of the second magnetic flux transmission part;

a magnetic flux density detector (i) disposed on an other of the detection object or the reference part to be movable within the gap relative to the one of the detection object or the reference part and (ii) configured to output a signal according to a density of a magnetic flux passing through the magnetic flux density detector;

a first magnetic flux collector disposed on one side of the magnetic flux density detector and facing the first magnetic flux transmission part; and a second magnetic flux collector disposed on an other side of the magnetic flux density detector and facing the second magnetic flux transmission part in a manner that binds the magnetic flux density detector between the first magnetic flux collector and the second magnetic flux collector, wherein a magnetic resistance of a first magnetic path that is defined between the first magnetic flux collector and the first magnetic flux transmission part and a magnetic resistance of a second magnetic path that is defined between the second magnetic flux collector and the second magnetic flux transmission part are respectively configured so that the magnetic flux density detector is movable within the gap relative to one of the detection object or the reference part along a circular path that has a radius between a radius of the first virtual circle and a radius of the second virtual circle where a detected magnetic flux density passing through the magnetic flux density detector decreases to a minimum, and throughout the circular path, a center of the magnetic flux density detector is disposed at a position that is radially offset by a predetermined offset distance from a midpoint between the first magnetic flux transmission part and the second magnetic flux transmission part, and toward the second magnetic flux transmission part along a radial direction of the first virtual circle away from the rotation axis of the detection object.

2. The position detector of claim 1, wherein
the first magnetic flux collector has a face, the face of the first magnetic flux collector faces the first magnetic flux transmission part and has a straight line shape, and
the second magnetic flux collector has a face, the face of the second magnetic flux collector faces the second magnetic flux transmission part and has a straight line shape.

3. The position detector of claim 1, wherein the magnetic flux density detector is configured to move to a plurality of points along the circular path and the detected magnetic flux density passing through the magnetic flux density detector decreases to the minimum within the plurality of points along the circular path.

4. The position detector of claim 1, wherein the detected magnetic flux density passing through the magnetic flux density detector decreases to the minimum at a location within an entire length of the circular path.

5. The position detector of claim 1, wherein the magnetic flux density detector is the only magnetic flux density detector of the position detector.

6. The position detector of claim 1, wherein the circular path has an extent that the detection object or the reference part is configured to travel and the detected magnetic flux density passing through the magnetic flux density detector has the minimum and a maximum within the extent, and
the detected magnetic flux density passing through the magnetic flux density detector decreases to the minimum at a location within the extent of the circular path.

* * * * *